(12) United States Patent
Arquin et al.

(10) Patent No.: US 6,890,376 B2
(45) Date of Patent: May 10, 2005

(54) GAS PURIFICATION SYSTEM WITH AN INTEGRATED HYDROGEN SORPTION AND FILTER ASSEMBLY

(75) Inventors: Pierre J. Arquin, Arroyo Grande, CA (US); Nels W. Lindahl, San Luis Obispo, CA (US); Mark A. Canaan, San Luis Obispo, CA (US)

(73) Assignee: SAES Pure Gas, Inc., San Luis Obispo, CA (US)

( * ) Notice: Subject to any disclaimer, the term of this patent is extended or adjusted under 35 U.S.C. 154(b) by 0 days.

(21) Appl. No.: 10/607,190

(22) Filed: Jun. 26, 2003

(65) Prior Publication Data

US 2004/0099142 A1 May 27, 2004

Related U.S. Application Data

(63) Continuation of application No. 09/614,649, filed on Jul. 12, 2000, now Pat. No. 6,733,571.
(60) Provisional application No. 60/143,377, filed on Jul. 12, 1999.

(51) Int. Cl.$^7$ .......................... B01D 50/00; B01D 53/04
(52) U.S. Cl. ............................ 96/134; 96/154; 55/318; 55/482; 55/523; 55/525; 55/529
(58) Field of Search ............................... 95/14, 90, 114, 95/115, 116, 148, 273; 96/108, 112, 121, 126, 130, 131, 132, 419, 420, 154, 134; 55/315, 315.1, 523, 525, 529, 318, 482

(56) References Cited

U.S. PATENT DOCUMENTS

| | | | |
|---|---|---|---|
| 4,312,669 A | | 1/1982 | Boffito et al. |
| 5,080,693 A | * | 1/1992 | Bourne et al. ................ 95/116 |
| 5,114,447 A | * | 5/1992 | Davis ........................... 55/523 |
| 5,238,469 A | * | 8/1993 | Briesacher et al. ........... 95/115 |
| 5,456,740 A | * | 10/1995 | Snow et al. .................. 55/523 |

(Continued)

FOREIGN PATENT DOCUMENTS

| | | |
|---|---|---|
| GB | 2 177 079 | 1/1987 |
| JP | 61-107919 | 5/1986 |
| JP | 02-293310 | 12/1990 |
| WO | WO 99/19048 | 4/1999 |

OTHER PUBLICATIONS

Mykrolis Product Profile, Waferpure® Micro/Mini XL/Megaline Integrated Filters/ Purifiers, Particulate and molecular purification in the process took, pp. 1–4.*

(Continued)

Primary Examiner—Duane Smith
Mykrolis Product Profile, Waferpure® Gas Cabinet 300 Integrated Filter/Purifier, Particulate and molecular purification in the gas cabinet, pp. 1–4.*
Assistant Examiner—Jason M. Greene
(74) Attorney, Agent, or Firm—Paul L. Hickman; Perkins Coie LLP

(57) ABSTRACT

The present invention provides a gas purification system with improved efficiency, simpler construction, cost reductions, form factor improvements, and increased durability. The present invention provides cost and form factor improvements through fewer components overall and through utilizing multiple integrated components. Prior art gas purification systems are more bulky and complicated. The present invention achieves increased thermal efficiency through utilization of a regenerative heat exchanger to recapture a portion of the heat energy transferred to the gas during the purification process. Prior art purifiers lacked a regenerative heat exchanger. The present invention integrates the two components into one integrated heater and purification vessel assembly. The present invention integrates the two discrete components into one integrated hydrogen sorption and particle filter assembly. The integrated hydrogen sorption and particle filter assembly is also capable of operating at higher temperatures. This eases maintenance and manufacture. The resulting gas purification system is simpler through utilizing fewer components, smaller by utilizing fewer and integrated components, and reduced cost through fewer components, smaller components and through reduced manufacture labor requirements.

20 Claims, 8 Drawing Sheets

U.S. PATENT DOCUMENTS

| | | | | |
|---|---|---|---|---|
| 5,490,868 A | * | 2/1996 | Whitlock et al. | 55/503 |
| RE35,725 E | | 2/1998 | Briesacher et al. | |
| 5,985,007 A | | 11/1999 | Carrea et al. | |
| 6,068,685 A | | 5/2000 | Lorimer et al. | |
| 6,156,105 A | | 12/2000 | Lorimer et al. | |
| 6,168,645 B1 | | 1/2001 | Succi et al. | |
| 6,232,204 B1 | | 5/2001 | Lorimer et al. | |
| 6,251,344 B1 | | 6/2001 | Goldstein | |
| 6,733,571 B1 | * | 5/2004 | Arquin et al. | 95/90 |

OTHER PUBLICATIONS

Mykrolis Product Profile, Waferpure® SL 1.125" C–Seal Purifiers Integrated Filter/Purifier, Particulate and molecular purification in the gas stick, pp. 1–4.*

Mykrolis Catalog, Micro 200 SI Integrated particulate and molecular gas filter, Catalogue No.: WPRV200SI, pp. 1–2.*

Supplementary European International Search Report.*

* cited by examiner

GAS PURIFICATION SYSTEM WITH AN INTEGRATED HYDROGEN SORPTION AND FILTER ASSEMBLY

CROSS REFERENCE TO RELATED APPLICATIONS

The present application claims benefit pursuant to 35 U.S.C. § 120 and is a continuation of U.S. application Ser. No. 09/614,649 entitled "Gas Purification System With An Integrated Hydrogen Sorption And Filter Assembly," filed Jul. 12, 2000 and issued as U.S. Pat. No. 6,733,571 B1 on May 11, 2004, which claims priority under 35 U.S.C. § 119(e) from U.S. Provisional Application No. 60/143,377, filed Jul. 12, 1999, both of which are incorporated herein in their entirety by reference.

BACKGROUND OF THE INVENTION

The invention relates generally to gas purification systems for the purification of noble gases and nitrogen. In particular, the method of purification consists of heating an impure gas, contacting the impure gas with an impurity sorption material to produce a purified gas, cooling the purified gas to a temperature less than about 100° C., and contacting the purified gas with a hydrogen sorption material to remove residual hydrogen. The system contains an improved, low temperature hydrogen sorption and filter apparatus for substantially removing all residual hydrogen and particles from the purified gas.

In the semiconductor manufacturing industry, pure gases are used in a variety of manufacturing processes, such as chemical vapor deposition (CVD), plasma etch, etc. The purity of the gas used in the manufacturing process becomes more critical as the feature width of integrated circuits decreases. For example, more than a decade ago feature widths in the range of 3 to 5 microns were standard. Currently, integrated circuits having feature widths of less than 0.2 microns are in production. With smaller feature widths, even a very low level of contaminants can damage an integrated circuit, thereby destroying its functionality or degrading its performance. Typical contemporary process specifications require process gases to have less than 10 parts per billion (ppb) of contaminants, and preferably less than 1 ppb of contaminants.

One prior art gas purifier utilizes hot getter materials for the removal of impurities from noble gases and nitrogen. The getter materials are encased in stainless steel containers which are typically heated to a temperature in the range of 300° to 450° C. Unfortunately, stainless steel outgases a significant amount of hydrogen at temperatures above approximately 200° C. In the past when process specifications allowed 100 ppb of hydrogen in a purified process gas this was not a major problem. However, with contemporary process specifications, the hydrogen outgassed from hot stainless steel surfaces has become a significant problem.

A second vessel containing a hydrogen sorption material is typically used to remove the residual hydrogen. Briesacher et al. U.S. Pat. No. 5,238,469, issued Aug. 24, 1993 (Briesacber) discloses a typical vessel containing a hydrogen sorption material. This vessel contains a material which will sorb hydrogen from the gas flow. A separate vessel of hydrogen sorption material adds size, complexity and cost to the gas purification systems.

In addition to purification of impure gas, the gas must also be filtered to remove particles. Particles as small as 0.003 micron must be removed from the gas flow. To remove particles, dedicated particle filters are added to the outlet sections of the gas purification systems. The material utilized for the filter element is typically Teflon, but other more expensive materials such as steel may be used.

Particle filters are very precise and expensive components of the gas purification systems. In addition to cost, particle filters also add complexity and physical size to the gas purification systems. Teflon filters are temperature sensitive and cannot be operated in environments above approximately 100° C. Teflon filters can be damaged or destroyed if operated above 100° C. Teflon filters may also be contaminated with moisture or water vapor. A damaged, destroyed or contaminated filter must be replaced.

What is needed is a gas purification system which reduces the complexity, cost and physical size for equivalent purification and particle filtration performance.

SUMMARY OF THE INVENTION

The present invention fulfills the needs over the prior art. The present invention provides a gas purification system with improved efficiency, simpler construction, cost reductions, form factor improvements, and increased durability.

The present invention provides cost and form factor improvements through fewer components overall and through utilizing multiple integrated components. Prior art gas purification systems are more bulky and complicated.

The present invention achieves increased thermal efficiency through utilization of a regenerative heat exchanger to recapture a portion of the heat energy transferred to the gas during the purification process. Prior art purifiers lacked a regenerative heat exchanger.

Prior art gas purification systems utilized discrete heater and purification chambers where the present invention integrates the two components into one integrated heater and purification vessel assembly.

Prior art gas purification systems also utilized discrete residual hydrogen sorption and particle filtering components. The present invention integrates the two discrete components into one integrated hydrogen sorption and particle filter assembly. The integrated hydrogen sorption and particle filter assembly is also capable of operating at higher temperatures. This eases maintenance and manufacture.

The resulting gas purification system is simpler through utilizing fewer components, smaller by utilizing fewer and integrated components, and reduced cost through fewer components, smaller components and through reduced manufacturing labor requirements.

DETAILED DESCRIPTION OF THE PREFERRED EMBODIMENTS

Figure 1:
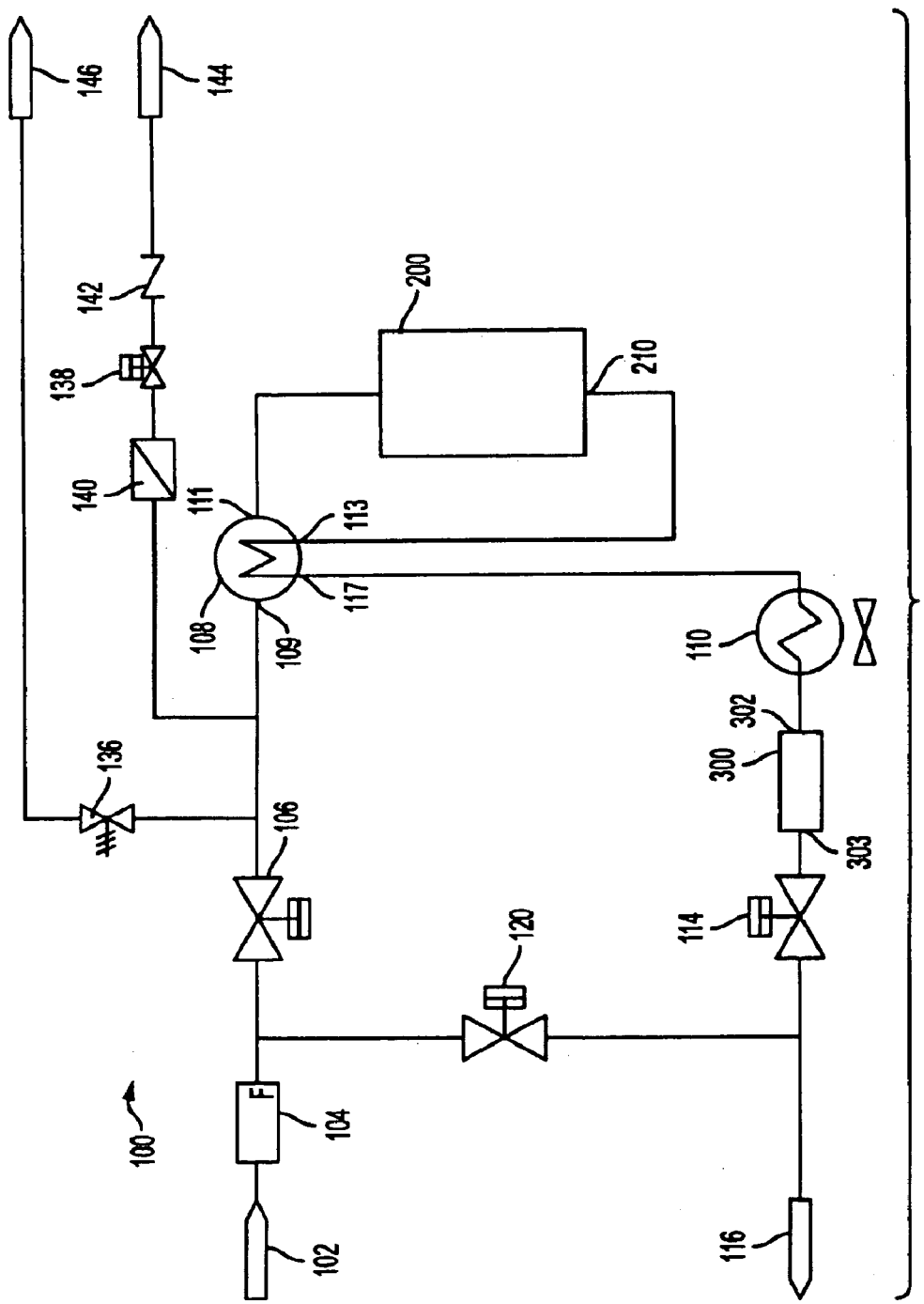
FIG. 1 illustrates a schematic of a heated getter, gas purification system in accordance with the present invention.

FIG. 1 schematically illustrates a gas purification system 100 in accordance with one embodiment of the present invention. The gas purification system 100 includes an inlet 102, an optional mass flow meter 104, a first solenoid activated valve 106, a first heat exchanger assembly 108, a heated getter vessel 200, a second heat exchange assembly 110, an integrated hydrogen sorption and particle filter assembly 300, a second solenoid activated valve 114, and an outlet 116. The system 100 also includes a bypass valve 120, an inlet option valve 130, an outlet option valve 132, an outlet sample valve 134, a pressure relief valve 136, a vent valve 138, a vent line filter 140, a vent line check valve 142, a vent outlet 144, and a relief line vent 146.

The interior surfaces of the gas purification system which may be contacted by a gas should be clean and well-polished. For example, the interior surfaces of all of the connecting tubing, the valves, and the various gas handling assemblies should be made of a polished, non-reactive metal having a sufficiently close grain to minimize gas adsorption. The desirable degree of smoothness of the polished metal surface should be between 5 and 25 microinch Ra. Appropriate metals which can provide such surfaces include stainless steel and industry-standard alloys such as hastelloy, incoloy, and monel, which are available from a variety of sources. Such metals are typically electropolished to provide the proper surface specifications, as is well known to those skilled in the art.

The heated getter vessel 200 may be made from any suitable material having sufficient strength and high temperature resistance, e.g., metallic materials. In a preferred embodiment, heated getter vessel 200 is made of stainless steel.

A source of impure gas is coupled to gas inlet 102. By impure gas, it is meant that the gas typically includes impurities in the range of 0.1–10 parts per million (ppm). While, these gases may be sufficiently pure for many applications, they are considered impure for the ultra-clean processes required for semiconductor manufacturing. Examples of such impure gases include nitrogen or one of the noble gasses as provided by commercial gas companies such as Air Products Corporation of Allenstown, Pa. and Air Liquide of Chicago, Ill.

Mass flow meter 104 is coupled to inlet 102 by a length of tubing and is used to accurately monitor the amount of gas flowing through the gas purification system 100. Valve 106 is coupled to mass flow meter 104 by a length of tubing and is normally open during the operation of gas purification 100. The cool gas inlet 109 of the gas to gas heat exchanger 108 is coupled to the valve 106 by a length of tubing and is operative to heat the gas prior to its introduction into the integrated heater and getter assembly 200. The preheated gas outlet 111 of the gas to gas heat exchanger 108 is coupled to the inlet of the heated getter vessel 200 by a length of tubing. The detailed description of the components and the operation of the heated getter vessel 200 are discussed in more detail below in the discussion of FIG. 2.

The outlet 210 of the heated getter vessel 200 is coupled to the heated gas inlet 113 of the gas to gas heat exchanger 108 by a length of tubing. The gas to gas heat exchanger 108 is operable to cool the heated gas from the outlet of the heated getter vessel 200 and transfer a significant portion of the energy in the heated gas to the impure gas. The precooled gas outlet 117 of the gas to gas heat exchanger 108 is coupled to the inlet of the gas to air heat exchanger 110 by a length of tubing. The gas to air heat exchanger 110 is operable to transfer thermal energy in the gas to air which is forced across the exterior surface of the gas to air heat exchanger 110.

The outlet of the gas to air heat exchanger 110 is coupled to the inlet 302 of the integrated hydrogen sorption and particle filter assembly 300 by a length of tubing. The detailed description of the components and the operation of the integrated hydrogen sorption and particle filter assembly 300 are discussed in more detail below in the discussion of FIG. 3. The outlet 303 of the integrated hydrogen sorption and particle filter assembly 300 is coupled to the second solenoid activated valve 114 by a length of tubing. The second solenoid activated valve 114 is coupled to the outlet 116 by a length of tubing.

Figure 2:
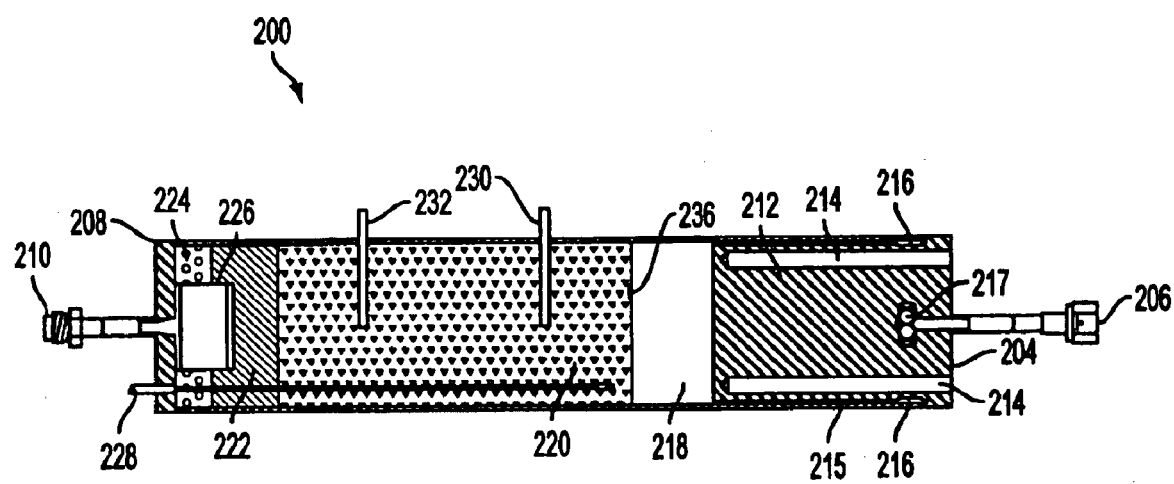
FIG. 2 illustrates a getter vessel of a heated getter, gas purification system in accordance with the present invention.

FIG. 2 illustrates the heated getter vessel 200. The heated getter vessel 200 preferably includes an elongated, cylindrical outer enclosure 202, a first end 204, an inlet 206 proximate to the first end 204, a second end 208, an outlet 210 proximate to the second end 208, a gas heater body 212, a plurality of heater elements 214, a first quantity of purification material 220, a second quantity of purification material 222, a quantity of shot 224, an outlet screen assembly 226, a first thermocouple 228, a second thermocouple 230, a third thermocouple 232, and a fourth thermocouple 234.

The first end 204 and second end 208 are preferably welded gas-tight to the elongated cylindrical outer enclosure 202. The inlet 206 is coupled to the annular volume 216 via a plurality of passages 217 which extend through the gas heater body 212. The heater elements 214 are coupled to an electrical power source (not shown) for heating the gas heater body 212. The gas heater body 212 is operable to heat the gas as the gas flows in the inlet 206, through the passages 217 to the first annular volume 216, then the second annular volume 215, to the unoccupied volume 218 between the gas heater body 212 and the first quantity of purification material 220.

The gas is heated as it flows through the plurality of passages 217 and the first annular volume 216 and second annular volume 215. The combination of the plurality of passages 217 and the first annular volume 216 and second annular volume 215 distributes the gas flow over the heated surfaces throughout the gas heater body 212. The temperature to which the gas is heated is generally greater than 200° C., and is preferably greater than 300° C., e.g. 300°–450° C. The operational efficiency of the preferred heated getter vessel 200 is greatly enhanced by heating the gas to these temperatures.

In a preferred embodiment the first quantity of purification material 220 is a getter material. Also in a preferred embodiment the second quantity of purification material 222 is a getter material.

Impurities are removed from the heated gas as the heated gas passes over the surface of, or contacts, the first quantity of getter 220. The impurities are chemically sorbed into the surface of the first quantity of getter 220. The gas released from the heated getter vessel 200 is therefore purified, and typically has less than 1–10 parts per billion (ppb) of contaminant gasses, other than residual hydrogen.

Unfortunately, the hot stainless steel surfaces of the heated getter vessel 200 and interconnecting tubing typically create 10–25 ppb of hydrogen.

The non-evaporable getter materials useful in the present invention are characterized by a sorption capacity for active gases. Examples of suitable metals for non-evaporable getters include, among others, zirconium, vanadium, iron. As disclosed in U.S. Pat. Nos. 3,203,901; 3,926,832; 4,071,335; 4,269,624; 4,306,887; 4,312,669; 4,405,487; and 4,907,948 (the disclosures of each of which is incorporated herein by reference) the manufacture and use of zirconium alloy getter materials are well known to those skilled in the art. The specific getter material used is chosen based upon the temperature range available, and upon the specific gas which is to be purified.

For example, if a noble gas is to be purified, the getter material can be an alloy of Zr—V—Fe. Such alloys generally have a weight composition such that the percentage of weight of the three elements when plotted on a ternary composition diagram lie with a polygon having as its corners defined by (a) 75% Zr--20% V--5% Fe; (b) 45% Zr--20% V--35% Fe; (c) 45% Zr--50% V--5% Fe. Such getter materials are described in U.S. Pat. No. 4,312,669. Preferably, a ternary alloy having a weight of Zr (70 wt. %)--V (24.6 wt. %)--Fe (5.4 wt. %) is used. Such alloys are available commercially in various forms as St707™ Getter Alloy (SAES GETTERS S.p.A., Milan, Italy).

A suitable getter material for purification of both noble gases and nitrogen is an alloy of Zr—Fe. Such alloys are known to the art, and preferably consist of from 15 to 30% by weight of Fe, and from 70 to 85% by weight Zr (as described by U.S. Pat. No. 4,306,887). An especially preferred getter material is an alloy of 84 wt. % zirconium and 16 wt. % aluminum. Such alloys are available commercially in various forms as St101™ Getter Alloy (SAES GETTERS S.p.A., Milan, Italy).

The physical embodiment of the getter material is not critical. A variety of getter material forms are known to the art or are commercially available. For example, the getter material can consist of a multiplicity of small pellets. Alternatively, the getter material may be provided in powdered form, or as a surface coating on a ceramic substrate.

After the heated gas contacts the first quantity of getter 220, the heated gas flows over the surface of, or contacts, the second quantity of getter 222 and flows into the quantity of shot 224. The shot 224 provides a ferrous reactive mass to enhance safety features of the heated getter vessel 200.

Figure 2A:
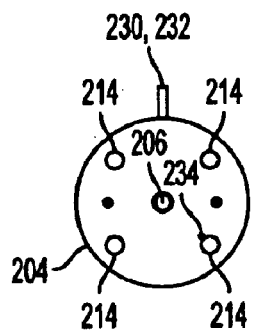
FIG. 2A illustrates an inlet end cap of FIG. 2 in more detail in accordance with the present invention.

FIGS. 2A illustrates the first end 204 of the heated getter vessel 200. The location of the inlet 206, the plurality of heater elements 214 and the fourth thermocouple 234 are shown.

Figure 2B:
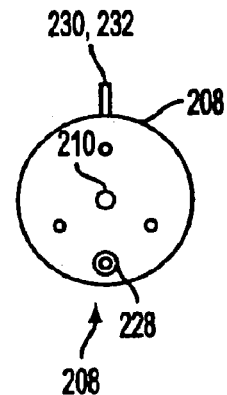
FIG. 2B illustrates an outlet end cap of FIG. 2 in more detail in accordance with the present invention.

FIG. 2B illustrates the second end 208 of the heated getter vessel 200. The location of the outlet 210 and the first thermocouple 228 are shown.

Figure 2C:
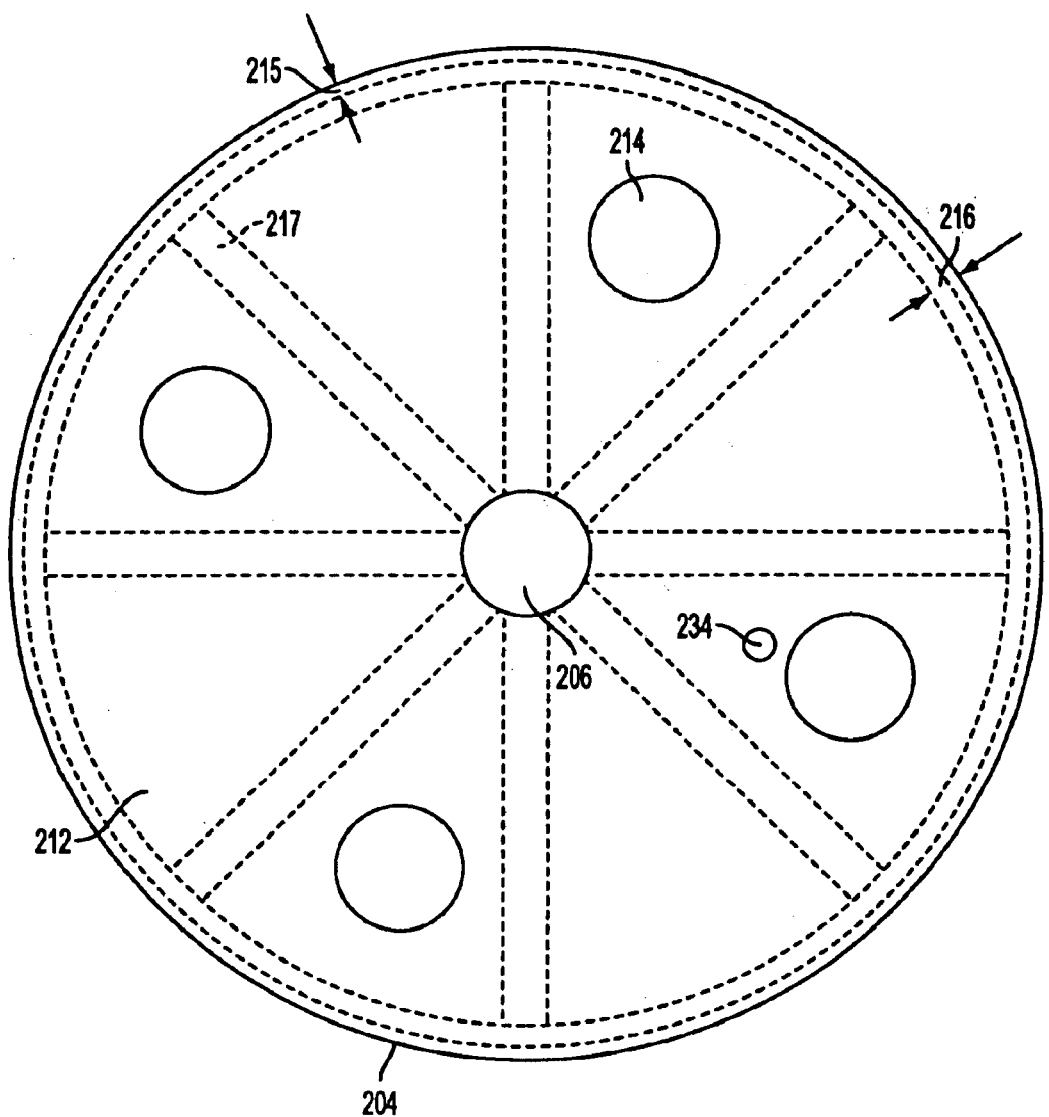
FIG. 2C illustrates a detailed view of an inlet end cap of a getter vessel of a heated getter, gas purification system in accordance with the present invention.

FIG. 2C illustrates a detailed view of the first end 204 of the heated getter vessel 200. The inlet 206 the plurality of heater elements 214 and the fourth thermocouple 234 are shown. In addition, the plurality of passages 217 are also shown. The passages 217 may be in any convenient pattern, size and number. The inlet 206 may also be off center rather than centered on the first end 204. The passages are operable to provide additional heated surface area to be exposed to the gas flow as the gas flows to the first annular volume 216.

The first annular volume 216 is provided to transition and distribute the gas flow from the passages 217. As the gas flows into the first annular volume 216, the gas flow is spread into a thin layer to flow over the heated surfaces of the first annular volume 216 and second annular volume 215. The second annular volume further thins and distributes the gas flow over the heated surface of the gas heater body 212. The relative size and location of the first annular volume 216 and second annular volume 215 are shown.

Figure 2D:
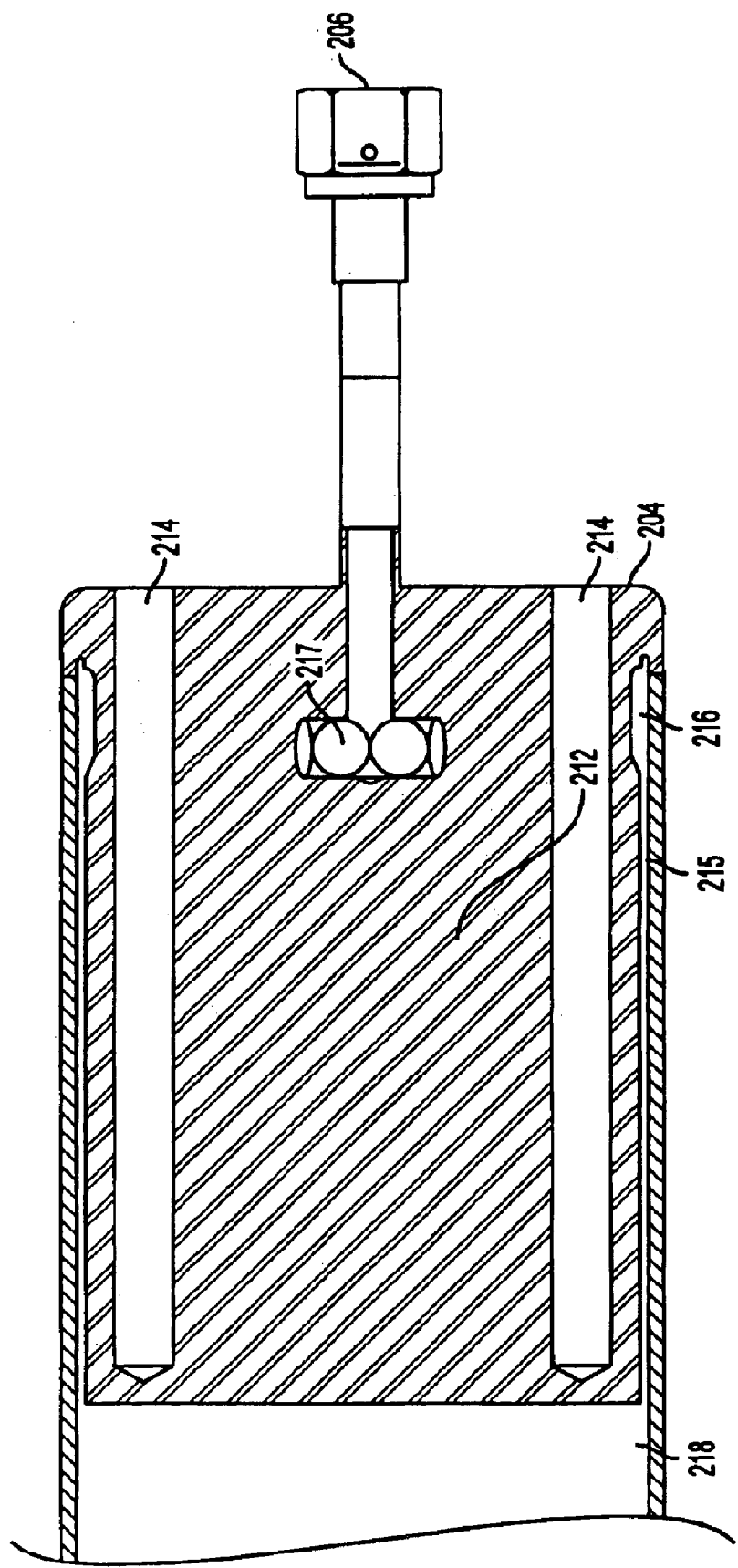
FIG. 2D illustrates a detailed sectional view of an inlet end of a getter vessel of a heated getter, gas purification system in accordance with the present invention.

FIG. 2D illustrates a detailed sectional view of first end 204 of the heated getter vessel 200. FIG. 2D illustrates the length of the second annular volume 215 and the gas heater body 212.

A plurality of heaters may be utilized. Heaters may also be in additional locations such as a resistive heater adjacent to and in contact with the of the heated getter vessel 200.

Getter columns are hazardous because the getter material contained therein is highly reactive with high concentrations of impurities. For example, in the event a high concentration, e.g., a few percent depending on the gas flow rate, of an impurity, e.g., oxygen, is introduced into a getter column containing a known zirconium-based getter material, an exothermic reaction occurs; the heat from which may cause melting of the containment wall of the vessel. The containment wall, which is typically formed of stainless steel, may melt at temperatures as low as about 1,000° C. because the getter material contacting the containment wall reacts therewith and forms a eutectic composition. If melting of the containment wall results in the formation of a hole therein, then breach of containment of the getter material occurs, which is potentially catastrophic.

The shot 224 is disposed around outlet screen assembly 226. The shot 224 may be any suitable material capable of protecting outlet screen assembly 226 from substantial damage, as will be explained in more detail later. Preferred shot 224 include, but are not limited to, metallic materials, e.g., stainless steel, and ceramic materials, e.g., quartz, SiC, SiN, and $Al_2O_3$. The shot 224 is preferably in the form of relatively small diameter particles having a substantially spherical shape, e.g., balls, or an assortment of generally cylindrical and generally spherical shapes, e.g., shot. In a preferred embodiment, shot 224 is comprised of stainless steel shot having a diameter of 0.125 inch to 0.375 inch.

The first thermocouple 228, second thermocouple 230 and third thermocouple 232 are temperature sensors disposed in first quantity of getter 220. The first thermocouple 228 is disposed in the heated getter vessel 200 so as to extend substantially through the first quantity of getter 220. The first thermocouple 228, second thermocouple 230 and third thermocouple 232 are coupled to a control unit (not shown), the operation of which will be described in more detail later.

In a preferred embodiment, first thermocouple 228, second thermocouple 230 and third thermocouple 232 are thermocouple elements. The use of fast-acting thermocouple elements with a thin sheath is preferred for quicker response time. The thermocouple elements may be disposed in a single sheath or in separate sheaths. Those skilled in the art will recognize that other temperature sensing devices, e.g., a platinum resistance temperature device (RTD) or a thermistor, also may be used.

In operation, preheated gas to be purified enters heated getter vessel 200 through inlet 206. The gas is preheated to a temperature in the range of from about 300° C. to about 400° C. by the gas heater body 212. The gas then flows through a first quantity of getter 220, a second quantity of getter 222, a quantity of shot 224, and outlet screen assembly 226. Impurities are sorbed from the gas as the gas flows through first quantity of getter 220. The purified gas exits heated getter vessel 200 through outlet 210.

In the event gas which contains a high concentration of impurities, e.g., oxygen, nitrogen, or oxygen-containing gases such as CO, $CO_2$, and $H_2O$, enters heated getter vessel 200, an exothermic reaction occurs when the gas contacts the first quantity of getter 220 and/or the second quantity of getter 222. Such high impurity gas may enter heated getter vessel 200 through either inlet 206 or outlet 210. For example, high impurity gas may enter through inlet 206 if heated getter vessel 200 is inadvertently connected to an improper source of gas. High impurity gas may enter through outlet 210 as the result of backfeeding which may occur if gas facility lines for, e.g., argon and nitrogen, are cross-connected.

If high impurity gas enters through outlet 210, the quantity of shot 224 buffers the alloy filter assembly 226 from the melt zone area above it, thereby saving the alloy filter assembly 226 from destruction.

Barrier material 224 is disposed proximate to the outlet filter 226 and separates purification material 222 from the outlet filter 226. Barrier material 224 may be any suitable material capable of protecting the outlet filter 226 from substantial damage, as will be explained in more detail later. Preferred barrier materials include, but are not limited to, metallic materials, e.g., stainless steel, and ceramic materials, e.g., quartz, SiC, SiN, and $Al_2O_3$. The barrier material 224 is preferably in the form of relatively small diameter particles having a substantially spherical shape, e.g., balls, or an assortment of generally cylindrical and generally spherical shapes, e.g., shot. In a preferred embodiment, barrier material 224 is comprised of stainless steel shot having a diameter of 0.125 inch to 0.25 inch.

Temperature sensor 228 is disposed in the first and second quantities of getter 222, 220. Temperature sensor 228 is capable of sensing the temperature of the first quantity of getter 222 proximate to the outlet and a the temperature of the second quantity of getter 220. Temperature sensor 228 is coupled to control unit, the operation of which will be described in more detail later. In a preferred embodiment, temperature sensor 228 is a thermocouple element. The use of fast-acting thermocouple elements with a thin sheath is preferred for quicker response time. The thermocouple elements may be disposed in a single sheath or in separate sheaths. Those skilled in the art will recognize that other temperature sensing devices, e.g., a platinum resistance temperature device (RTD) or a thermistor, also may be used.

In operation, preheated gas to be purified enters heated getter vessel 200 through inlet 206. The gas is preheated to a temperature in the range of from about 300° C. to about 425° C. by a gas heater (shown in FIG. 2D). The gas then flows through the first and second quantities of getter 220, 222, barrier material 224, and outlet filter 226. As the gas flows through the first and second quantities of getter 222, 220, the getter sorbs impurities from the gas. The purified gas exits heated getter vessel 200 through outlet 210.

In the event gas which contains a high concentration of impurities, e.g., oxygen, nitrogen, or oxygen-containing gases such as CO, $CO_2$, and $H_2O$, enters heated getter vessel 200, an exothermic reaction occurs when the gas contacts the first and second quantities of getter 222, 220. Such high impurity gas may enter heated getter vessel 200 through either inlet 206 or outlet 210. For example, high impurity gas may enter through inlet 206 if heated getter vessel 200 is inadvertently connected to an improper source of gas. High impurity gas may enter through outlet 210 as the result of backfeeding which may occur if gas facility lines for, e.g., argon and nitrogen, are cross-connected.

The temperature sensor 228 is located at a point which is a distance $D_1$ below the top of first quantity of getter 220. The point at which temperature sensor 228 is located is selected to fall within a melt zone. As used in connection with the description of the invention, the term "melt zone" means the region in which the maximum temperature generated by the exothermic reaction between an impurity and the purification material occurs the fastest. It has been discovered that when high impurity gas enters heated getter vessel 200 through inlet 206 the maximum temperature generated by the exothermic reaction occurs the fastest below the top surface of the first quantity of getter 220. It is believed that the maximum temperature occurs below the top surface of the first quantity of getter 220 because the exothermic reaction is not instantaneous and because of the gas velocity of the incoming gas.

For normal flow rates, e.g., 1 cubic meter/hour/kilogram of purification material, the distance $D_1$ has been found to be about 1 inch for new purification material to about 2.5 inches for aged purification material. Thus, the melt zone moves deeper into the bed as the purification material ages. Furthermore, for lower gas flow rates, the distance $D_1$ may be slightly shorter because of the reduced gas velocity of the incoming gas. If the gas inlet provides for uniform distribution of the incoming gas, then the melt zone will normally be located in the center of the purification material. On the other hand, if the gas inlet provides for nonuniform distribution of the incoming gas, e.g., an annular distribution, then the melt zone may be offset from the center of the purification material.

Those skilled in the art will recognize that the location of the melt zone is a function of certain parameters including the geometry of the heated getter vessel e.g., the diameter and the length of the vessel, the gas flow rate, the type of impurity, and the age of the purification material. Depending on these parameters, it is believed that the melt zone may occur from just above 0 inch to about 6 inches below the top of the first quantity of getter 220. In a standard 5 inch diameter vessel at a normal gas flow rate, temperature sensor 228 is preferably located from just below 0 inch to just below 3 inches below the top surface of the first quantity of getter 220, with a more preferred range being from about 0.5 inch to about 2.5 inches and a most preferred range being from about 1 inch to about 2 inches.

The lower portion of heated getter vessel 200 is configured to inhibit the formation of a eutectic composition between the getter material and either exterior wall of the heated getter vessel 200 or outlet filter 226 and to detect rapidly the onset of an exothermic reaction which indicates that excess impurities are being backfed into the heated getter vessel 200. Barrier material 224 separates the second quantity of getter 222 at the bottom of heated getter vessel 200 from outlet filter 226. The thickness $D_2$ of barrier material 224 is selected to protect outlet filter 226 from substantial damage by inhibiting the formation of a eutectic composition between the getter and outlet filter 226 so that such eutectic composition does not melt a hole through the outlet filter 226. When barrier material 224 is a layer of stainless steel shot, a thickness $D_2$ of about 1 inch has been found to be sufficient to protect outlet filter 226 from substantial damage.

Temperature sensor 228 is located at a point which is a distance $D_3$ above the bottom of the second quantity of getter 222. The point at which temperature sensor 228 is located is also selected to fall within a melt zone, i.e., the region in which the maximum temperature generated by the exothermic reaction between an impurity and the getter material occurs the fastest. It has been discovered that when high impurity gas enters heated getter vessel 200 through outlet 210, e.g., by backfeeding from a cross-connected gas facility line, the maximum temperature generated by the exothermic reaction occurs the fastest above the bottom surface of the second quantity of getter 222.

It is believed that the maximum temperature occurs above the bottom surface of the second quantity of getter 222 because the exothermic reaction is not instantaneous and because of the gas velocity of the incoming gas. In tests in which $N_2$ was backfed into a standard 5 inch diameter vessel at a gas flow rate of >20 m³/hr, the distance $D_3$ has been found to be about 1.5 inches to about 2 inches. As discussed above, the location of the melt zone depends on certain parameters including the geometry of the heated getter vessel, e.g., the diameter and the length of the vessel, the gas flow rate, and the type of impurity. Depending on these parameters, it is believed that the melt zone may occur from just above 0 inch to about 6 inches above the bottom of the second quantity of getter 222. In a standard 5 inch diameter vessel, temperature sensor 228 is preferably located from 0 inch to just below 3 inches above the bottom surface of the second quantity of getter 222, with a more preferred range being from about 0.5 inch to about 2.5 inches and a most preferred range being from about 1 inch to about 2 inches.

A control unit measures the temperatures sensed by the temperature sensor 228 in heated getter vessel 200 and actuates, e.g., by air actuation, isolation valves 106' and 114, bypass valve 120, and vent valve 138 when certain alarm temperatures are reached or when a certain temperature increase rate is reached or when one of the temperature sensors is destroyed. When the temperature sensor is a thermocouple element, an open thermocouple indicates that the thermocouple element may have been destroyed. The control unit may be any electronic device capable of performing these functions, e.g., microprocessor, microcontroller, computer, or discrete logic, and may be coupled into the existing control computer for the getter-based gas purifier.

At the first alarm level, which occurs when a first alarm temperature is measured or when a temperature increase rate is reached, control unit actuates isolation valves 106 and 114 to isolate heated getter vessel 200, i.e., to close off both the inlet and outlet of heated getter vessel 200, and opens bypass valve 120. At the alarm level, which occurs when an alarm temperature is measured, control unit actuates vent valve 138 to vent gas from heated getter vessel 200.

These actions shut down the exothermic reaction (if present) by isolating heated getter vessel 200. A temperature increase of this magnitude is a reliable indicator that an exothermic reaction has reached a dangerous level. The action vents gas to help release impurities and to protect heated getter vessel 200 from structural failure. Venting gas protects heated getter vessel 200 from structural failure by reducing the internal pressure, which is on the order of 100–150 psig in normal operation, within heated getter vessel 200 to prevent unsafe structural conditions due to the high temperatures (near 1000° C.) from the melted purification material. Venting will also, in the case of the upper melt zone, flush out the impurities remaining in the inlet tubing with noble gas stored below the melt zone in the getter column. The action vents as much gas as possible from heated getter vessel 200, e.g., down to about 0–5 psig.

The normal operating temperature of a heated getter vessel 200 in an argon gas purifier is about 400° C. Accordingly, the first alarm temperature is preferably within a range of from about 450° C. to about 650° C.

In the event control unit measures a temperature at or above a first alarm temperature, control unit actuates isolation valves 106 and 114 to isolate heated getter vessel 200. When heated getter vessel 200 is isolated, the feed gas to be purified, which already has a high purity level, flows directly from source 102 to outlet 116 via bypass valve 120 so that the gas distribution network continues to be supplied with gas. In the event control unit measures a temperature at or above an alarm temperature, control unit actuates vent valve 138 to vent gas from heated getter vessel 200. When vent valve 138 is actuated, gas flows from heated getter vessel 200 through particle filter 140, vent valve 138, check valve 142, and vent 144 to a gas cabinet which may form part of the gas distribution network. In the event control unit measures a temperature at or above an alarm temperature, control unit closes bypass valve 120 to shut off the supply of gas to the gas distribution network. In addition to being configured to carry out alarm actions when certain temperatures are measured, control unit is preferably further configured to provide "upscale" protection. In other words, in the event control unit determines that a temperature sensor may have been destroyed, e.g., by detecting an open thermocouple, control unit assumes a maximum temperature, e.g., the alarm temperature, has been reached and carries out the corresponding alarm actions.

Figure 2E:
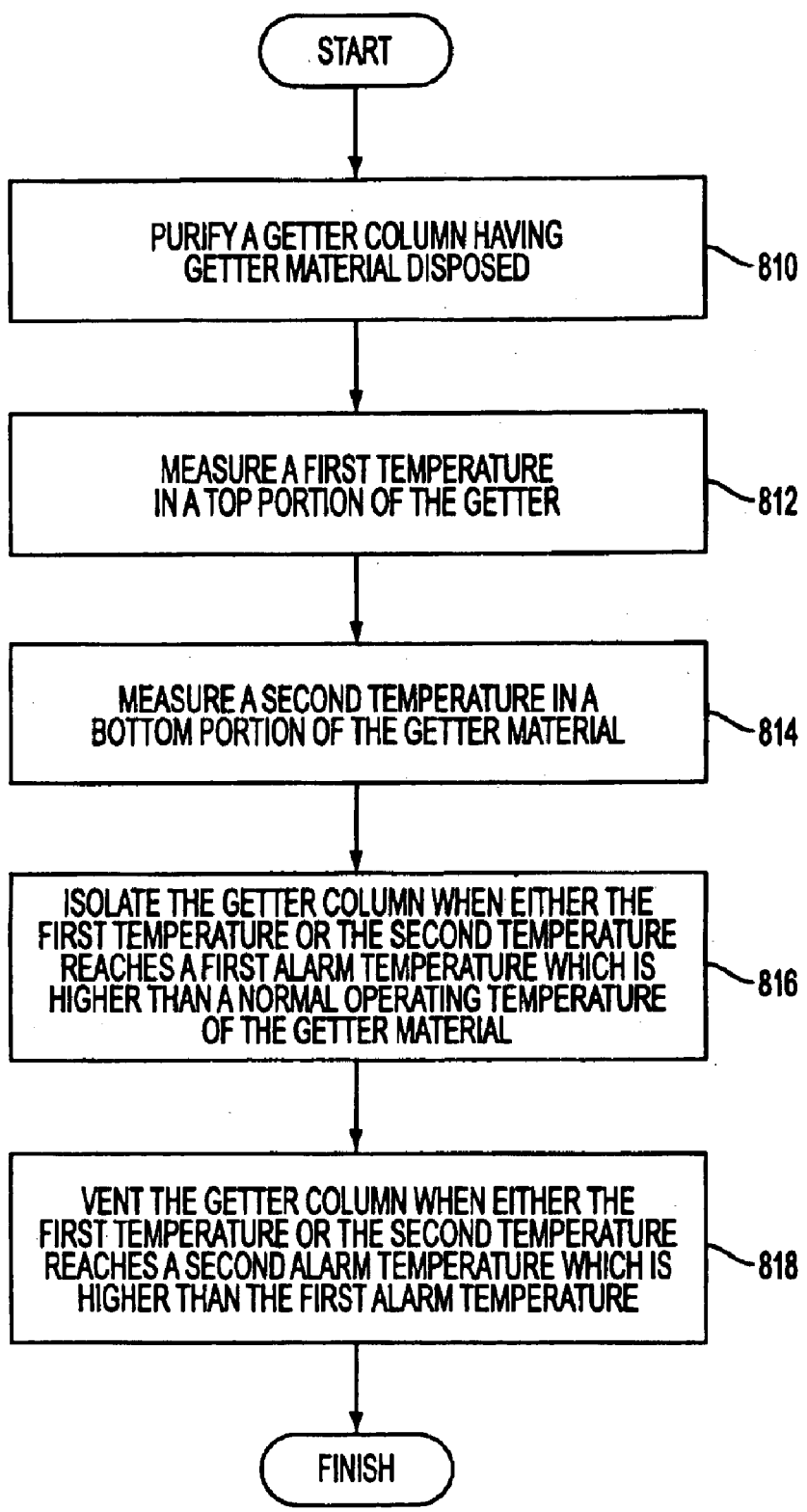
FIG. 2E illustrates a flow chart of the operation of a heated getter, gas purification system in accordance with the present invention.

FIG. 2E is a flowchart of a method of protecting a getter column in accordance a preferred embodiment of the present invention. In step 810 a getter column having getter material disposed therein is provided. Heated getter vessel 200 described herein is an example of a getter column suitable for use in step 810. Those skilled in the art will recognize, however, that the method of the present invention is not limited to getter columns having the features of heated getter vessel 200. In step 812 a first temperature is measured in a top portion of the getter material. The first temperature may be measured by a control unit which is coupled to a temperature sensor disposed in the getter material as described above for heated getter vessel 200. The first temperature is preferably measured from 0 inch to just below 3 inches below the top of the getter material, with a preferred range being from about 0.5 inch to about 2.5 inches, and a more preferred range being from about 1 inch to about 2 inches. In step 814 a temperature is measured in a bottom portion of the getter material. The temperature is preferably measured from 0 inch to just below 3 inches above the bottom of the getter material, with a preferred range being from about 0.5 inch to about 2.5 inches, and a more preferred range being from about I inch to about 2 inches.

In step 816 the getter column is isolated when the temperature reaches a first alarm temperature which is higher than a normal operating temperature of the getter column. The getter column may be isolated by actuating isolation valves which prevent gas from entering either the inlet or the outlet of the getter column. As described above, isolating the getter purifier shuts down the exothermic reaction which occurs when high impurity gas enters the getter column. The first alarm temperature is preferably about 450° C. to about 650° C. In a preferred embodiment in which the getter column is part of an argon gas purifier, the normal operating temperature of the getter column is about 400° C.

In step 818 the getter column is vented when the temperature reaches an alarm temperature which is higher than the first alarm temperature. The getter column may be vented by actuating a vent valve which allows gas to flow out of the getter column. As described above, venting the getter column relieves the internal pressure therein, which is normally about 100–150 psig. This prevents such internal pressure from forcing molten getter material against the containment wall of the getter column and reacting therewith to form a eutectic composition. Venting also helps rid the getter column of excess impurities.

Figure 3:
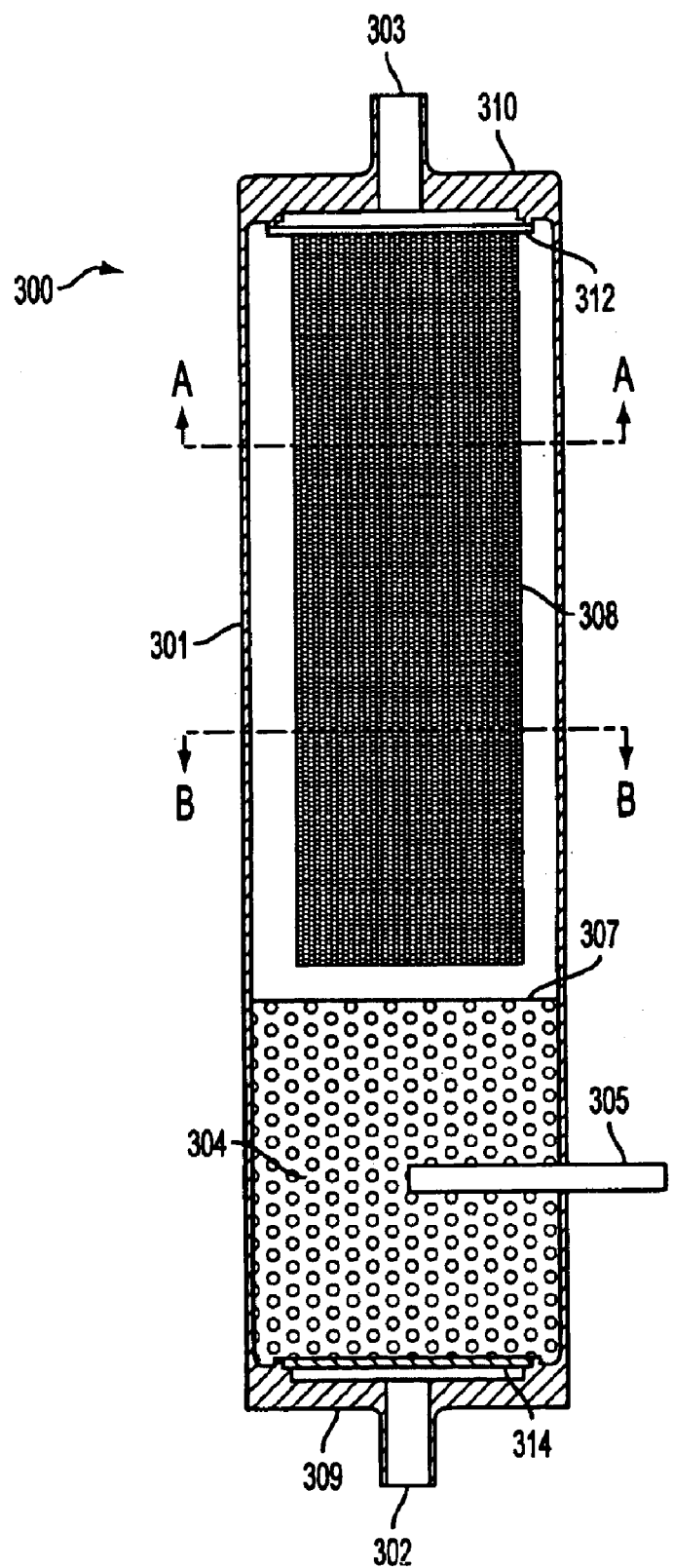
FIG. 3 illustrates an integrated, hydrogen sorption and particle filter assembly of a heated getter, gas purification system in accordance with the present invention.

FIG. 3 illustrates the integrated hydrogen sorption and particle filter assembly 300. The integrated hydrogen sorption and particle filter assembly 300 includes an elongated outer enclosure 301, a first end cap 309, an inlet 302 proximate to the first end cap 309, a second end cap 310, an outlet 303 proximate to the second end cap, a inlet screen 314, a quantity of shot 306, a quantity of hydrogen sorption material 304, a thermocouple 305, a screen 307, a plurality of filter elements 308, and a filter element mount plate 312.

The first end 309 and second end 310 are preferably welded gas-tight to the elongated outer enclosure 301. The outer enclosure 301, the first end cap 309 and the second end cap 310, define an inner volume. The inner volume contains the quantity of shot 306, the quantity of hydrogen sorption material 304, the thermocouple 305, the screen 307, the plurality of filter elements 308, the filter element mount plate 312, and the inlet screen 314. The inlet 302 is in fluid communication with the inner volume of the outlet enclosure 301.

Gas flows in the inlet 302 through the inlet screen 314 and the quantity of shot 306, to the quantity of hydrogen sorption material 304. The quantity of hydrogen sorption material 304 is operable to absorb the substantially all residual hydrogen from the gas. From the quantity of hydrogen sorption material 304, the gas flows through the screen 307, and through the plurality of filter elements 308. The plurality of filter elements 308 are operable to substantially trap all particles in the gas flow. From the filter elements, the purified, filtered gas flows out the outlet 303 to the outlet 116 of the gas purification system 100.

The hydrogen sorption material 304 is preferably a non-evaporative getter which is effective to remove hydrogen at temperatures below about 100° C., more generally less than about 60° C. Preferably, the hydrogen sorption material is used at temperatures ranging from ambient temperatures to about 40° C.

Hydrogen sorption materials are characterized by a sorption capacity for hydrogen gas. Examples of suitable hydrogen getters include, among others, zirconium, titanium, hafnium, uranium, thorium, vanadium, tungsten, tantalum, niobium, and alloys of these metals. A preferred subclass of hydrogen getter materials useful in the present invention are the zirconium alloys.

For example, the getter material can be an alloy of Zr—V—Fe for both noble gases and nitrogen. Such alloys generally have a weight composition such that the percentage of weight of the three elements when plotted on a ternary composition diagram lie with a polygon having as its corners defined by (a) 75% Zr--20% V--5% Fe; (b) 45% Zr--20% V--35% Fe; (c) 45% Zr--50% V--5% Fe. Such getter materials are described in U.S. Pat. No. 4,312,669. Preferably, a ternary alloy having a weight of Zr (70 wt. %)--V (24.6 wt. %)--Fe (5.4 wt. %) is used. Such alloys are available commercially in various forms as St707™ Getter Alloy (SAES GETTERS S.p.A., Milan, Italy).

If the gas to be purified is a noble gas or nitrogen, the getter material can be an alloy of Zr—Fe. Such alloys are known to the art, and preferably consists of from 15 to 30% by weight of Fe, and from 70 to 85% by weight Zr (described by U.S. Pat. No. 4,306,887). An especially preferred getter material is an alloy of 84 wt. % zirconium and 16 wt. % aluminum. Such alloys are available commercially in various forms as St101™ Getter Alloy (SAES GETTERS S.p.A., Milan, Italy).

In a preferred embodiment, the hydrogen sorption getter 304 is a ternary alloy having a weight of Zr (70 wt. %)--V (24.6 wt. %)--Fe (5.4 wt. %) is used. Such alloys are available commercially in various forms as St707™ Getter Alloy (SAES GETTERS S.p.A., Milan, Italy). Once sorbed, oxygen, carbon and nitrogen atoms cannot be released again by this hydrogen getter material, even at its melting point (1400° C.+/−100° C.), due to the formation of strong chemical bonds with the alloy atoms.

Hydrogen atoms, however, diffuse into the hydrogen sorption material bulk more quickly than other atoms and distribute almost uniformly within the bulk. Due to well-known equilibrium phenomena, hydrogen sorption capacity of these materials actually increases with decreasing temperatures. However, because of the relatively weak forces which bind these atoms to the hydrogen sorption material alloy, some of the hydrogen sorbed at a low temperature or at room temperature can be released at high temperatures. In other words, the hydrogen sorption is reversible and depends upon the hydrogen sorption material 304 temperature.

The temperature sensor 305 is provided in the integrated hydrogen sorption and particle filter assembly 300. The temperature sensor 305 monitors the temperature of the hydrogen sorption material 304. This provides easier activation and reactivation of the hydrogen sorption material 304 by providing a temperature sensor integral to the integrated hydrogen sorption and particle filter assembly 300. The temperature sensor is electrically coupled to the control unit. The temperature sensor 305 also monitors the temperature of the gas flowing through the integrated hydrogen sorption and particle filter assembly 300. If the temperature rises above an alarm temperature, the control unit may interrupt the flow through the integrated hydrogen sorption and particle filter assembly 300 by closing the inlet valve 106 and the outlet valve 114. The alarm temperature is preferably selected to be less than about 100° C.

Since the integrated hydrogen sorption and particle filter assembly 300 includes a metallic filter, the integrated hydrogen sorption and particle filter assembly 300 can be regenerated by heating the assembly above about 200° C. to drive off the hydrogen trapped in the hydrogen sorption getter 304. Hydrogen isotopes ($D_2$, $T_2$) are sorbed in the same way as normal hydrogen and present the same behavior.

Since the integrated hydrogen sorption and particle filter assembly 300 and the gas flowing through it are at temperatures below about 100° C., the stainless steel of its construction produces almost no contaminating hydrogen. Nonetheless, residual hydrogen in the purified gas flowing through the integrated hydrogen sorption and particle filter assembly 300 is effectively scavenged from the gas, because the hydrogen sorption getter 304 is effective even at room temperatures. The integrated hydrogen sorption and particle filter assembly 300 of the present invention has been found to reduce hydrogen in purified nitrogen gas from 10–25 ppb to less than 1 ppb.

The plurality of filter elements 308 in the integrated hydrogen sorption and particle filter assembly 300 are preferably manufactured from 0.003 micron sintered nickel material or stainless steel material. Such filter element materials are commercially available from Mott Filters of Farmington, Conn. The metal filter elements 308 allow the integrated hydrogen sorption and particle filter assembly 300 to be regenerated without concern for damaging the temperature sensitive, Teflon filters of the prior art.

The integrated hydrogen sorption and particle filter assembly 300 also provides a form factor improvement over the prior art. In one prior art application the resulting previous desecrate components required an assembly over 20 inches in length. A properly sized integrated hydrogen sorption and particle filter assembly 300 was less than 13.25 inches in length.

Figure 4:
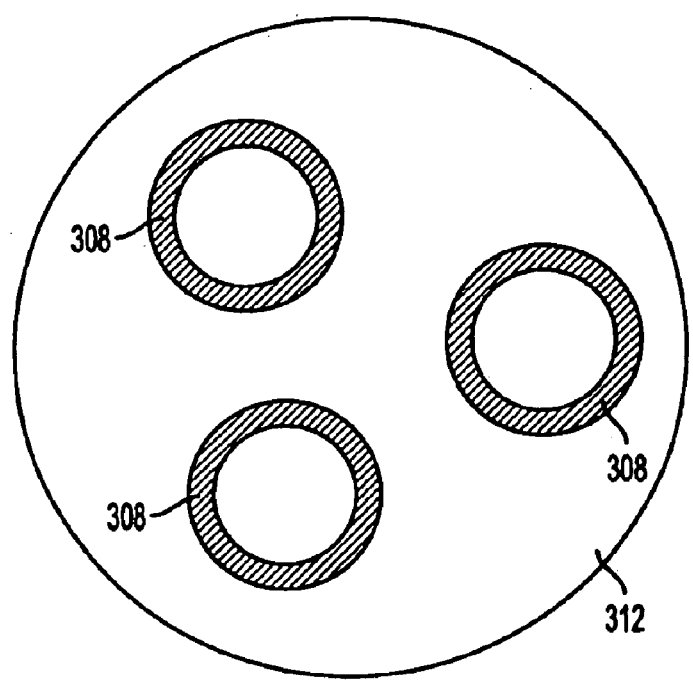
FIG. 4 illustrates a sectional view "A" of FIG. 3.

FIG. 4 illustrates a section view of the plurality of filter elements 308 of FIG. 3. FIG. 4 shows the plurality of filter elements 308 and the filter element mount plate 312. The filters are assembled by first welding the filter elements 308 to the filter element mount plate 312, then welding the filter element mount plate 312 to the second end cap 310.

Figure 5:
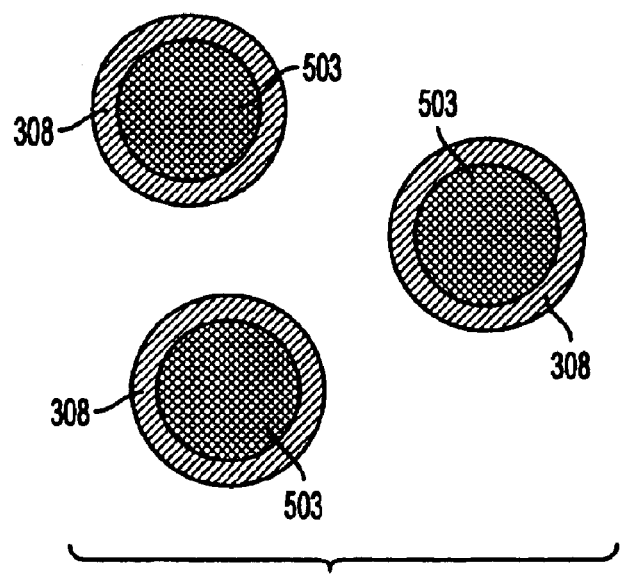
FIG. 5 illustrates a sectional view "B" of FIG. 3.

FIG. 5 illustrates a section view of the plurality of filter elements 308 of FIG. 3. FIG. 5 shows the plurality of filter elements 308 and the filter element ends 503.

Figure 6:
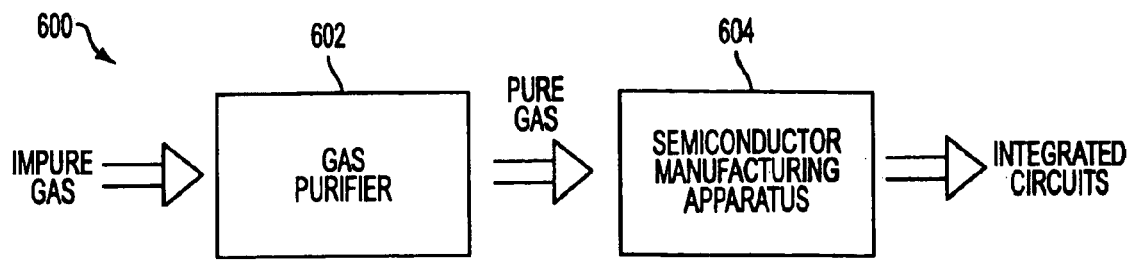
FIG. 6 illustrates a flow chart of an integrated circuit manufacturing apparatus utilizing a heated getter, gas purification system in accordance with the present invention.

FIG. 6 is a process flow chart showing utilizing a gas purification system 100 to purify an impure gas in block 602. The resulting pure gas is utilized in a semiconductor manufacturing apparatus and process in block 604 to manufacture integrated circuits.

Figure 7:
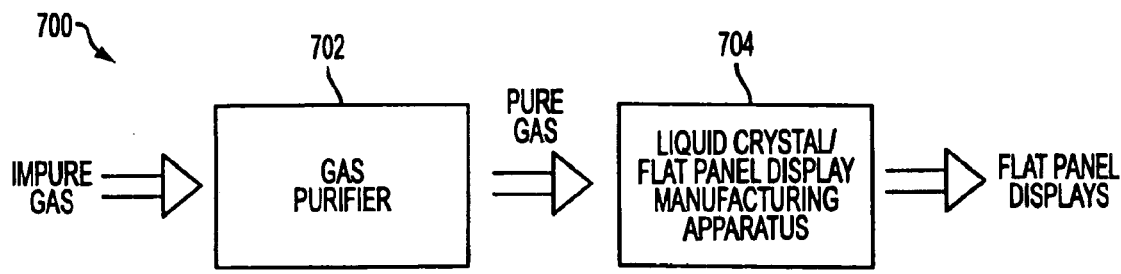
FIG. 7 illustrates a flow chart of a flat panel display manufacturing apparatus utilizing a heated getter, gas purification system in accordance with the present invention.

FIG. 7 is a process flow chart showing a gas purification system 100 to purify an impure gas in block 702. The resulting pure gas is utilized in a liquid crystal or flat panel display manufacturing apparatus and process in block 704 to manufacture flat panel displays.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A gas purification system providing hydrogen sorption and particle filtering, said gas purification system comprising:
   a) a hydrogen sponge including hydrogen sorption material;
   b) a particle filtering device; and
   c) an enclosure having an inlet and an outlet, said enclosure housing said hydrogen sponge and said particle filter device, said hydrogen sponge proximal to said inlet, said particle filter device being proximal to said outlet, said hydrogen sponge and said particle filter device arranged within said enclosure such that a gas flowing into said enclosure via inlet and out of said enclosure via said outlet, must follow a flow path first contacting said hydrogen sorption material and then flowing through the particle filtering device;
wherein said hydrogen sorption material can be thermally regenerated by heating said enclosure above 200 degrees centigrade.

2. A gas purification system as recited in claim 1, wherein the particle filtering device is manufactured from a sintered metal.

3. A gas purification system as recited in claim 1, wherein the particle filtering device is substantially capable of removing particles from said outlet gas flow as small as 0.003 micron.

4. A gas purification system as recited in claim 2, wherein the particle filtering device is manufactured from at least one of: nickel, stainless steel.

5. A gas purification system as recited in claim 2, wherein the particle filtering device is comprised of a plurality of filtering elements.

6. A gas purification system as recited in claim 5, wherein the filtering element has a conical shape.

7. A gas purification system as recited in claim 5, wherein the filtering element is a disk shape.

8. A gas purification system as recited in claim 1, wherein the hydrogen sorption material is selected from the group consisting of: zirconium, palladium, platinum, rhodium, ruthenium, nickel, titanium and alloys thereof.

9. A gas purification system as recited in claim 1, wherein the hydrogen sorption material comprises a non-evaporative getter alloy selected from the group consisting of: zirconium-vanadium-iron alloys and zirconium-iron alloys.

10. A gas purification system as recited in claim 1, further comprising a temperature measuring device.

11. A gas purification system providing hydrogen sorption and particle filtering, said gas purification system comprising: a hydrogen sponge including hydrogen sorption material; a particle filtering device; and an enclosure having an inlet and an outlet, said enclosure housing said hydrogen sponge and said particle filter device, said hydrogen sponge proximal to said inlet, said particle filter device being proximal to said outlet, said hydrogen sponge and said particle filter device arranged within said enclosure such that a gas flowing into said enclosure via inlet and out of said enclosure via said outlet, must follow a flow path first contacting said hydrogen sorption material and then flowing through the particle filtering device, wherein said hydrogen sorption material can be thermally regenerated by heating said hydrogen sorption material to at least 200 degrees centigrade.

12. A gas purification system as recited in claim 11, wherein the particle filtering device is manufactured from a sintered metal.

13. A gas purification system as recited in claim 11, wherein the particle filtering device is substantially capable of removing particles from said outlet gas flow as small as 0.003 micron.

14. A gas purification system as recited in claim 12, wherein the particle filtering device is manufactured from at least one of: nickel, stainless steel.

15. A gas purification system as recited in claim 12, wherein the particle filtering device is comprised of a plurality of filtering elements.

16. A gas purification system as recited in claim 15, wherein the filtering element has a conical shape.

17. A gas purification system as recited in claim 15, wherein the filtering element is a disk shape.

18. A gas purification system as recited in claim 11, wherein the hydrogen sorption material is selected from the group consisting of: zirconium, palladium, platinum, rhodium, ruthenium, nickel, titanium and alloys thereof.

19. A gas purification system as recited in claim 11, wherein the hydrogen sorption material comprises a non-evaporative getter alloy selected from the group consisting of: zirconium-vanadium-iron alloys and zirconium-iron alloys.

20. A gas purification system as recited in claim 11, further comprising a temperature measuring device.

* * * * *